United States Patent
Das et al.

(10) Patent No.: US 10,769,123 B2
(45) Date of Patent: Sep. 8, 2020

(54) WORKLOAD-DRIVEN RECOMMENDATIONS FOR COLUMNSTORE AND ROWSTORE INDEXES IN RELATIONAL DATABASES

(71) Applicant: Microsoft Technology Licensing, LLC, Redmond, WA (US)

(72) Inventors: Sudipto Das, Redmond, WA (US); Bolin Ding, Redmond, WA (US); Vivek R. Narasayya, Redmond, WA (US); Manoj A. Syamala, Redmond, WA (US); Jingjing Wang, Seattle, WA (US); Gaoxiang Xu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 607 days.

(21) Appl. No.: 15/635,399

(22) Filed: Jun. 28, 2017

(65) Prior Publication Data
US 2018/0096006 A1 Apr. 5, 2018

Related U.S. Application Data

(60) Provisional application No. 62/402,033, filed on Sep. 30, 2016.

(51) Int. Cl.
*G06F 16/21* (2019.01)
*G06F 16/22* (2019.01)
(Continued)

(52) U.S. Cl.
CPC .......... *G06F 16/217* (2019.01); *G06F 16/221* (2019.01); *G06F 16/2282* (2019.01); *G06F 16/245* (2019.01); *G06F 16/284* (2019.01)

(58) Field of Classification Search
CPC .. G06F 16/9535; G06F 16/217; G06F 16/221; G06F 16/245; G06F 16/284; G06F 16/2282
See application file for complete search history.

(56) References Cited

U.S. PATENT DOCUMENTS 6,223,171 B1 * 4/2001 Chaudhuri .......... G06F 11/3447
707/718
7,483,918 B2 1/2009 Chaudhuri et al.
(Continued)

OTHER PUBLICATIONS

Neugebauer, Niko, "Clustered Columnstore Indexes—part 41 ("Statistics")", Published on: Sep. 13, 2014 Available at: http://www.nikoport.com/2014/09/13/clustered-columnstore-indexes-part-41-statistics/.
(Continued)

*Primary Examiner* — Cam Y T Truong

(57) ABSTRACT

Provided are methods and systems for generating physical database design tuning recommendations. Given a workload, the system analyzes the workload to identify and recommend a set of rowstore and columnstore indexes optimal for the performance of the workload. The system is designed to estimate the size of the columnstore index (at the granularity of each column) without actually building the index, estimate the improvement in query performance that each columnstore index would result in when built, and automatically derive the workload used for the physical design tuning task by analyzing stored query execution history data. This automatic workload derivation is orthogonal to columnstores and can be used even when columnstore indexes are not being used.

17 Claims, 4 Drawing Sheets

(51) Int. Cl.
  *G06F 16/245* (2019.01)
  *G06F 16/28* (2019.01)

(56) References Cited

U.S. PATENT DOCUMENTS

| | | | |
|---|---|---|---|
| 7,945,909 B2 | 5/2011 | Mariotti et al. | |
| 8,386,450 B2 | 2/2013 | Simmen | |
| 8,768,927 B2 | 7/2014 | Yoon et al. | |
| 8,805,800 B2 | 8/2014 | Narasayya et al. | |
| 2003/0093408 A1* | 5/2003 | Brown | G06F 16/2272 |
| 2006/0085378 A1 | 4/2006 | Raizman et al. | |
| 2006/0085484 A1 | 4/2006 | Raizman et al. | |
| 2008/0133608 A1 | 6/2008 | Brown et al. | |
| 2012/0323929 A1* | 12/2012 | Kimura | G06F 16/2282 |
| | | | 707/748 |
| 2013/0086038 A1 | 4/2013 | Perry | |
| 2014/0280373 A1 | 9/2014 | Raitto et al. | |
| 2016/0078089 A1 | 3/2016 | Hu et al. | |
| 2016/0224600 A1* | 8/2016 | Munk | G06Q 20/102 |

OTHER PUBLICATIONS

Dave, Pinal, "SQL Server—Finding Size of a Columnstore Index Using DMVs", Published on: Jun. 10, 2012 Available at: http://blog.sqlauthority.com/2012/06/10/sql-server-finding-size-of-a-columnstore-index-using-dmvs/.

Nevarez, Benjamin, "Improve the Performance of Data Warehouse Queries with Columnstore Indexes", Published on: Feb. 24, 2012 Available at: http://sqlmag.com/sql-server-2012/improve-performance-data-warehouse-queries-columnstore-indexes.

Abadi, Daniel, "Hybrid Row-Column Stores: A General and Flexible Approach", Published on: Mar. 10, 2015 Available at: http://blogs.teradata.com/data-points/hybrid-row-column-stores-general-flexible-approach/.

Miyroshnichenko, Lesia, "Should You Use a Rowstore or a Columnstore?", Published on: Apr. 19, 2016 Available at: http://blog.memsql.com/should-you-use-a-rowstore-or-a-columnstore/.

Agrawal, et al., "Database Tuning Advisor for Microsoft SQL Server 2005", In Proceedings of the Thirtieth International Conference on Very Large Data Bases, Aug. 29, 2004, 12 pages.

Chaudhuri, et al., "An Efficient, Cost-Driven Index Selection Tool for Microsoft SQL Server", In Proceedings of 23rd International Conference on Very Large Data Bases, Aug. 25, 1997, pp. 146-155.

Agrawal, et al., "Automated Selection of Materialized Views and Indexes in SQL Databases", In Proceedings of the 26th International Conference on Very Large Data Bases. Sep. 10, 2000, pp. 496-505.

Dageville, et al., "Automatic SQL Tuning in Oracle 10g", In Proceedings of the Thirtieth International Conference on Very Large Data Bases, Aug. 31, 2004, 12 pages.

Finkelstein, et al., "Physical database design for relational databases", In Journal of ACM Transactions on Database Systems, vol. 13, Issue 1, Mar. 1988, pp. 91-128.

Lightstone, et al., "Physical Database Design: The Database Professional's Guide to Exploiting Indexes, Views, Storage, and More", In Publication of Morgan Kaufmann, Mar. 21, 2007, 449 pages.

Zilio, et al., "DB2 Design Advisor: Integrated Automatic Physical Database Design," In Proceedings of the VLDB, Toronto, Canada, 20014, 1087-1097.

Zilio, et al., "Recommending Materialized Views and Indexes with IBM DB2 Design Advisor," In Proceedings of ICAC 2004.

Chaudhuri, et al., "Self-Tuning Database Systems: A Decade of Progress," VLDB 2007: 3-14.

Larson, et al., "Columnar Storage in SQL Server 2012," IEEE Data Eng. Bull. 35(1), 2012, 6 pages.

Larson, et al., "Real-Time Analytical Processing with SQL Server," PVLDB 8(12): 1740-1751 (2015).

Larson, et al., "Enhancements to SQL Server Column Stores," SIGMOD Conference 2013: 1159-1168.

Lahiri, et al., "Oracle Database In-Memory: A Dual Format In-Memory Database," ICDE Conference 2015, IEEE, 1253-1258.

\* cited by examiner

WORKLOAD-DRIVEN RECOMMENDATIONS FOR COLUMNSTORE AND ROWSTORE INDEXES IN RELATIONAL DATABASES

This application claims the benefit of U.S. Provisional Patent Application No. 62/402,033, entitled "Workload-Driven Recommendations For Columnstore And Rowstore Indexes In Relational Databases," filed on Sep. 30, 2016, which is hereby expressly incorporated herein by reference in its entirety.

BACKGROUND

The performance of a database system can depend largely on its physical database design. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database management system (e.g., a relational database management system (RDBMS)), which provides access to the data in a database, processes data manipulation statements or queries. Such statements and queries are processed, for example, to retrieve, update, insert, and/or delete data in a database. Queries are defined by a query language supported by the database management system (which may be referred to simply as a "database system" or "database server"). For example, users can write queries and run them against a database to retrieve desired information from the database. In general, to retrieve requested information, a database server can retrieve an appropriate table from storage, load it into memory, and search row by row for the desired information. However, given the substantial size of most databases, searching for data in this manner is often time-consuming and inefficient.

To enhance performance in processing queries, database servers use indexes to help access data in a database more efficiently. Although all possible indexes for a database can be constructed, the number of possible indexes over a database can be very large and can significantly increase the memory requirements, including storage requirements, for the database, as well as the cost associated with keeping the indexes up-to-date as data is updated, inserted, and deleted. Also, many of the possible indexes may provide no or minimal performance advantage considering the data in the database, the organization of the data in the database, and the usage of the database as represented by a workload of queries executed against the database. Typical database systems therefore use only a subset of possible indexes for accessing databases.

A database administrator (DBA) typically selects a set of indexes for use by a database system from among possible combinations of indexes for a database. The effectiveness of any set of indexes depends, for example, on the data in the database, on the query optimizer selecting execution plans for the queries submitted by the users, and on the workload of queries to be executed against the database. As a database system evolves through database updates and modifications and through changes in workloads of queries, for example, new sets of indexes should be considered and selected to help maintain a desired level of performance of the database system.

Tuning the physical design of a database management system, which includes, among other things, selecting the optimal set of indexes, materialized views, and partitioning, is critical to achieve good application performance. However, the variety in choice of physical design structures makes the task of tuning a database system (database server) quite daunting. The selection of which physical design structure to create is also challenging because the creation of different physical design structures can have very different storage and update consequences (e.g., how attributes of the physical design are affected when data is updated, inserted, or deleted).

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

The present disclosure relates generally to database tuning and, more particularly, to techniques for generating physical database design tuning recommendations.

One embodiment of the present disclosure relates to a method for tuning a database, the method comprising: receiving an input workload, the workload including a plurality of queries; identifying, for each query in the workload, candidate indexes for the query, wherein the candidate indexes include rowstore indexes and columnstore indexes; for each candidate index, estimating a size of the candidate index, creating a hypothetical index based on the estimated size of the candidate index, and generating a cost estimate for the candidate index based on the corresponding hypothetical index created for the candidate index; for each query in the workload, determining one or more candidate indexes to recommend for the query based on the generated cost estimates; and generating a tuning recommendation for the workload based on the one or more candidate indexes determined for each query in the workload.

Another embodiment of the present disclosure relates to a system for tuning a database, the system comprising one or more processors and a non-transitory computer-readable medium coupled to the one or more processors having instructions stored thereon that, when executed by the one or more processors, cause the one or more processors to perform operations comprising: receiving an input workload, the workload including a plurality of queries; identifying, for each query in the workload, candidate indexes for the query; for each candidate index, estimating a size of the candidate index, creating a hypothetical index based on the estimated size of the candidate index, and generating a cost estimate for the candidate index based on the corresponding hypothetical index created for the candidate index; for each query in the workload, determining one or more candidate indexes to recommend for the query based on the generated cost estimates; and generating a tuning recommendation for the workload based on the one or more candidate indexes determined for each query in the workload.

Yet another embodiment of the present disclosure relates to a tangible, non-transitory computer readable medium, or media, storing machine readable instructions that, when executed by one or more processors, cause the one or more processors to perform operations comprising: receiving an input workload, the workload including a plurality of queries; identifying, for each query in the workload, candidate indexes for the query; for each candidate index, estimating a size of the candidate index, creating a hypothetical index based on the estimated size of the candidate index, and generating a cost estimate for the candidate index based on the corresponding hypothetical index created for the candidate index; for each query in the workload, determining one or more candidate indexes to recommend for the query based on the generated cost estimates; and generating a tuning recommendation for the workload based on the one or more candidate indexes determined for each query in the workload.

Further scope of applicability of the methods and systems of the present disclosure will become apparent from the more detailed description given below. However, it should be understood that the following detailed description and specific examples, while indicating embodiments of the methods and systems, are given by way of illustration only, since various changes and modifications within the spirit and scope of the concepts disclosed herein will become apparent to those skilled in the art from the following detailed description.

BRIEF DESCRIPTION OF THE DRAWINGS

These and other objects, features, and characteristics of the present disclosure will become more apparent to those skilled in the art from a study of the detailed description that follows in conjunction with the appended claims and drawings, all of which form a part of this disclosure. In the drawings:

Figure 1:
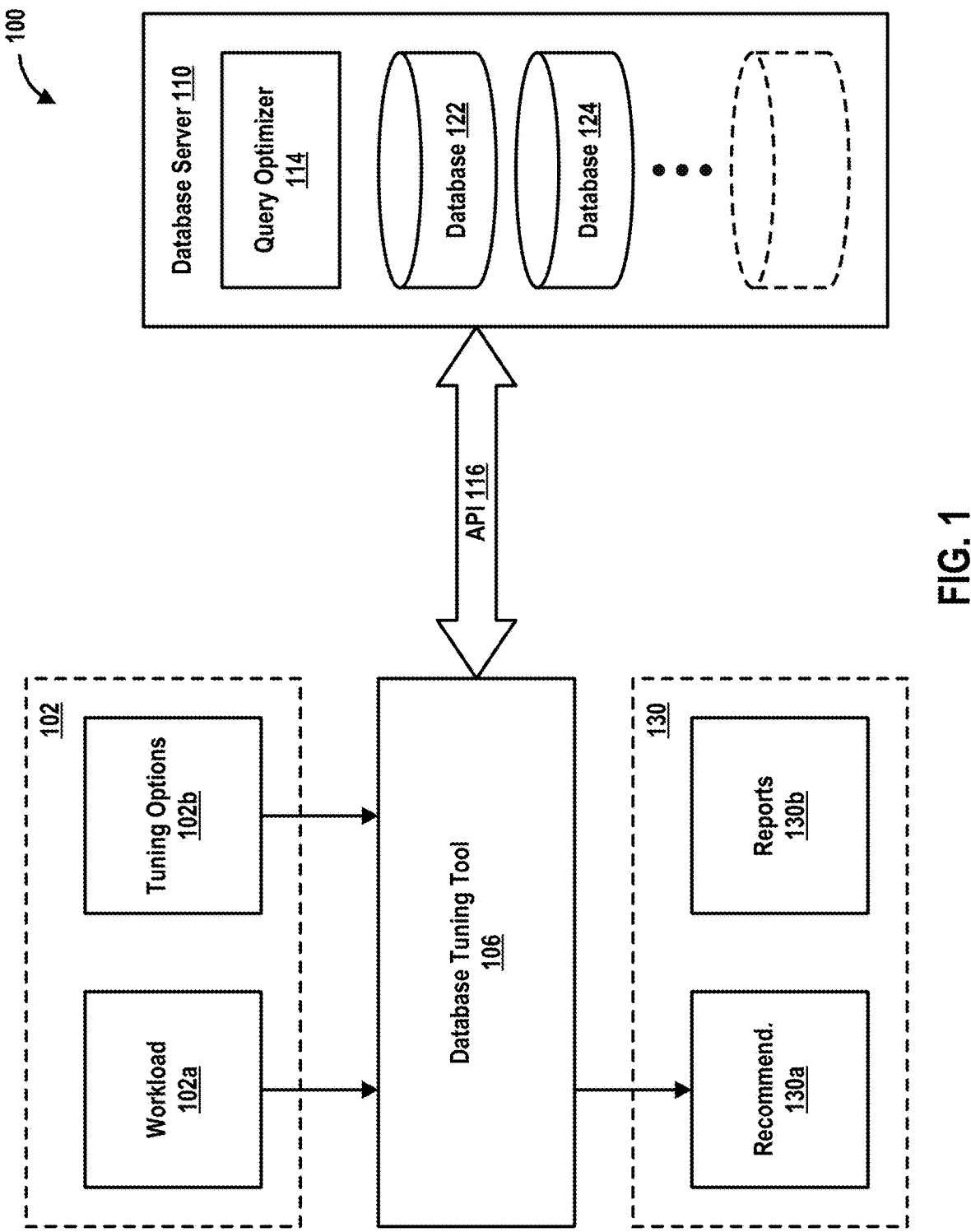
FIG. 1 is a block diagram illustrating an example system for generating physical database design tuning recommendations, according to one or more embodiments described herein.

The headings provided herein are for convenience only and do not necessarily affect the scope or meaning of what is claimed in the present disclosure.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

As described above, tuning the physical design of a database management system is essential to achieve good application performance. However, the variety in choice of physical design structures can make the task of tuning such a database system (database server) overwhelming. The selection of which physical design structure to create is also challenging because the creation of different physical design structures can have very different storage and update consequences (e.g., how attributes of the physical design are affected when data is updated, inserted, or deleted).

As a result of the above difficulties, a number of automated tools have been developed to reduce the burden on the DBA by helping to determine an appropriate physical design for a database. A physical database design tuning application or, more simply, a database tuning tool (which may be an automated tool), takes as input a given workload (e.g., a set of transaction processing statements, queries, updates, etc., that execute against the database server), and recommends appropriate indexes, materialized views (also known as indexed views), and data partitioning that are optimized for the given workload.

At least one existing database tuning tool is capable of, among other things, providing integrated physical database design recommendations for partitioning, indexes, and materialized views. This database tuning tool also allows a DBA to specify manageability requirements while optimizing for performance. The database tuning tool is able to scale to large databases and workloads using a variety of techniques including, for example, workload compression, reduced statistics creation, and exploiting test server to reduce load on production server.

A database tuning tool can be invoked with a workload for which the physical database design is to be tuned. The workload can be provided or obtained by the database tuning tool in a variety of ways. For example, a workload may be explicitly provided (e.g., input) to the database tuning tool by a DBA (e.g., using a graphical user interface to database trace, which is a tool for monitoring and logging events that execute on a database server, or as a database file). In another example, database tuning tool can automatically infer a workload from an area of memory (e.g., cache) in the database server that is dedicated to storing execution plans.

In addition to a workload, a database tuning tool can also be designed to take a variety of other inputs. For example, a database tuning tool may take as input a feature set to tune. Although a database tuning tool may be capable of tuning indexes, materialized views, and partitioning together, a DBA may need to limit tuning to one or more subsets of these features. For example, a DBA of an online transaction processing (OLTP) system may decide a priori to not include any materialized views. Another optional input may include, for example, an alignment constraint that a table and all its indexes must be partitioned identically (although different tables may be partitioned differently). In some designs, a user can specify a partial configuration (e.g., clustered index on a table, partitioning of a table or materialized view), and constrain the database tuning tool's recommendation according to this specification. Other optional inputs to a database tuning tool may include, for example, a storage constraint (e.g., the database tuning tool may allow specifying a bound on the storage that the physical design it recommends can consume) and/or a time constraint (e.g., an upper bound on the time that the database tuning tool is allowed to run).

The output of the database tuning tool is a physical database design recommendation (which may be referred to herein as a "configuration"). For example, the database tuning tool can recommend the following non-limiting and non-exhaustive physical design structures: (a) clustered and non-clustered indexes including filtered indexes; (b) materialized views; and (c) horizontal range partitioning.

At the core of at least one existing database tuning tool is a search process that explores the various alternative physical design configurations. The search process comprises a candidate selection phase which finds better candidate configurations for a single event (e.g., a batch of database statements). A subsequent enumeration phase finds candidate configurations which minimize the total optimizer-estimated cost for the workload passed to the database tuning tool for tuning. In one example, for any candidate index that the database tuning tool considers, it may use a database system optimizer's "what-if" (e.g., hypothetical output) API to obtain the cost (and query plan) for a query, assuming the index was present on the server. The database tuning tool may use a server extension to create hypothetical indexes, (indexes with only the metadata and statistics needed for optimization), and the "what-if" API to ensure that the database tuning tool's estimated improvements are in sync with the cost model of the database system optimizer. At the end of the search phase, the database tuning tool may generate a recommended configuration along with detailed reports for the recommendation.

While existing RDBMS have supported B-tree indexes for many decades, the past decade has seen the emergence of a different way of indexing the data, referred to as columnstore indexes. Instead of storing the data sorted in row-major format in a B-tree (e.g., store all columns in a row contiguously on disk), referred to herein as rowstore indexes for brevity, in a columnstore index data can be organized in a column-major format, stored one column at-a-time. The columns are joined to create the index. A traditional index groups and stores data for each row and then joins all the rows to complete the index. For some types of queries, the columnstore layout offers improved filtering, aggregating, grouping, and query execution times.

This columnar storage format has several advantages for read-mostly data analysis workloads: (a) if a query does not need to access all columns in a table, then columnar layout saves I/O and CPU costs by only accessing columns required in the query; (b) data within a column are usually from a uniform domain, allowing better compression; and (c) vectorized operations allow processing multiple columns rows in a column with a single operation.

The benefits of a columnstore index are clear when a query accesses large portions of data in a table. As a result, columnstore indexes have been predominantly used in data warehousing and other data analysis applications. However, if a query accesses only a small portion of the data, a suitable rowstore index (e.g., B-tree index, B+-tree index, B-link tree index, etc.) can be more efficient when compared to a columnstore index, since a rowstore index allows to selectively access rows in a table, while a columnstore index requires accessing all the rows in a table for the column being accessed. For complex applications with a variety of queries that range from queries accessing only a small number of rows to queries scanning the entire table (e.g., many of today's applications which use the data for operational analytics), the choice of rowstore or columnstore indexes on a table is not obvious and needs to be workload-driven. In addition, at least some database management systems support both columnstore and rowstore indexes on the same table, which makes this choice even more challenging.

In view of the various challenges described above, embodiments of the present disclosure relate to methods and systems for generating physical database design tuning recommendations. In some examples described below, the database tuning system may sometimes be referred to as a database tuning tool, depending on the context.

Further details will be provided in the sections that follow, which highlight the following non-limiting, non-exhaustive features of the methods and systems described herein: (i) given a workload, the system analyzes the workload to identify and recommend a set of rowstore and columnstore indexes optimal for the performance of the workload; (ii) the system may be configured to estimate the size of the columnstore index (at the granularity of each column) without actually building the index; (iii) the system may include extensions to a database system optimizer's "what-if" API to use the per-column sizes for columnstore indexes to estimate the improvement in query performance that each columnstore index would result in when built; and (iv) the system is able to automatically derive the workload used for the physical design tuning task by analyzing the query execution history stored for the database. In an embodiment, this automatic workload derivation is orthogonal to columnstores and can be used even when columnstore indexes are not being used.

Several key aspects of the proposed techniques and improvements are described in greater detail below. One of the technical problems addressed by the methods and systems described herein is recommending configurations with both columnstore and rowstore indexes for workloads that include a mix of queries for which neither rowstore nor columnstore indexes alone are optimal.

As will be further described below, in one or more embodiments of the present disclosure, a database tuning tool (e.g., database tuning engine, database tuning advisor, etc.) is capable of analyzing a workload to determine the mix of rowstore and columnstore indexes to build that is optimal for the given workload. In addition, in at least one embodiment, the database tuning tool is configured to (automatically) derive the workload based on execution history (e.g., queries, plans, runtime statistics, etc.) tracked by the database server. These two unique features of the database tuning tool, as well as other features further described below, offer advantages and improvements over existing physical database design tuning tools.

In an embodiment, the database tuning tool uses the database management system's query optimizer (hereinafter sometimes referred to simply as the "optimizer" for brevity) to estimate the potential benefit of an index without actually building the index. This is achieved, for example, by creating the metadata for the index and by using a sample of data to create statistics corresponding to the index. Such an index which is not actually created is called a "hypothetical index." Creation of a hypothetical index allows the optimizer to consider the index during optimization of a query, which provides the optimizer's estimate of improvement resulting from the presence of this index. In an embodiment, this estimate is used by the database tuning tool in its search for potential indexes to recommend.

Columnstore indexes are different from rowstore (e.g., B-tree) indexes since they are stored column-at-a-time and the optimizer needs its per-column sizes when optimizing a query in the presence of a columnstore index. If a query does not access all columns in a table, the execution engine can skip accessing those columns altogether, according to an embodiment. Therefore, the optimizer only needs to consider the cost of accessing the columns referenced in the query. This is different from rowstore indexes (e.g., B-tree indexes) since all columns in a row are stored together in the same, e.g., B-tree page, and hence for a rowstore index, the optimizer may only care about the total size of the index. In addition, the presence of a columnstore index also enables some search and transformation rules in the query optimizer (such as, for example, using vectorized operators).

As mentioned above, the database management server is configured to support hypothetical columnstore indexes to create metadata and allow the optimizer to recognize these hypothetical indexes as columnstore indexes such that the same set of search and transformation rules are used as if the index were actually built, according to an embodiment. In addition, the database management system query optimizer's "what-if" API is configured with the ability to specify per-column sizes for the hypothetical columnstore indexes, according to an embodiment.

In at least one embodiment, the database tuning tool is configured with the ability to optionally recommend columnstore indexes in conjunction with all other physical design recommendations that the database tuning tool is able to support (e.g., the database tuning tool can generate recommendations for both clustered and non-clustered columnstore indexes that are supported by the database management system). For example, in an embodiment, the workload provided as input to the database tuning tool, and the current database schema (e.g., structure and/or organization of the database system), may be used to determine which tables to build a columnstore index on.

FIG. 1 illustrates an example system 100 for generating physical database design tuning recommendations, in accordance with one or more embodiments. In at least one embodiment, the system 100 may reside on one or more computing devices, each of which may be a computing device similar to computing device 400 shown in FIG. 4 and described in greater detail below.

In at least one embodiment, the system 100 may include a database tuning tool 106, one or more database(s) to be tuned and/or referenced 122, 124, etc., input 102, and output 130. It should be understood that while two databases (122, 124) are illustrated in FIG. 1, the system 100 includes other suitable numbers (e.g., 1, 4, 8, etc.) of databases in other embodiments. One or more of databases 122, 124, etc., may also be an input (e.g., input 102) to the database tuning tool 106, in an embodiment. Although databases 122, 124, etc., are shown residing on database server 110, in some embodiments, one or more of databases 122, 124, etc., may reside on one or more separate servers other than database server 110.

It should be understood that in one or more embodiments, the example system 100 may include other components in addition to or instead of the example components illustrated and described below. Similarly, the system 100 for generating physical database design tuning recommendations may include fewer components than the number of example components shown, or one or more of the example components shown may be combined, without departing from the operations, features, or functionalities of the system as described herein. It should also be understood that the connections between the various servers, databases, and/or devices shown in the system 100 are merely an example of one way in which the servers, databases, and/or devices may be interconnected or arranged within the system 100, and that any or all of the components may be connected or arranged in numerous other ways in addition to or instead of the example manner shown.

In some embodiments, database tuning tool 106 may be invoked via a command line executable, a user interface (e.g., a graphical user interface), or by any other suitable means. In an embodiment, the database tuning tool 106 is a database tuning advisor for client physical design tuning. For example, in an embodiment, the database tuning tool 106 is a database tuning advisor that analyzes a workload (e.g., workload 102a) and generates one or more recommendations (e.g., recommendations 130a) for physical database design structures (e.g., indexes, indexed views, partitioning, etc.) to improve server performance for that workload. In such an embodiment, after analyzing a workload and generating a recommendation for the physical design of one or more databases (e.g., one or more of databases 122, 124, etc.), the database tuning advisor may generate the necessary script to implement the recommendation. In some embodiments, the database tuning tool 106 may reside on one or more test or production (database) servers.

Input 102 may include a workload 102a to tune and/or one or more tuning options 102b, according to some embodiments. Workload 102a may include a set of statements that execute against a database or databases to be tuned (e.g., one or more of databases 122, 124, etc.). For example, in an embodiment, the statements of workload 102a may be written in a language for creating, updating, and querying relational database management systems (e.g., SQL, TSQL, etc.). In an embodiment, one or more of the statements in workload 102a may be associated with a weight that represents the relative importance of the statement to the performance of the database system. In some embodiments, workload 102a may be obtained (e.g., retrieved, received, etc.) from a profiling tool of a database management system, or may be a file that includes an industry or organization benchmark. Workload 102a can be specified from a command line prompt, a graphical user interface, or the like. In an embodiment, input 102 may include an XML input file specified from a command line prompt. In such an instance, workload 102a is specified in the XML input file.

One or more tuning options 102b may also be included in input 102 to the database tuning tool 106, according to an embodiment. As used herein, tuning options 120b may include one or more of: a time constraint (e.g., a maximum tuning time), a storage constraint (e.g., a maximum disk space for tuning recommendations), an alignment constraint, a feature to be tuned, specifying a maximum number of columns to include in any index, specifying whether plan cache events from all databases are analyzed, a partial physical configuration (e.g., a clustered index on a table, partitioning of a table or index view may be specified as being a requirement), a logging condition, and the like. It should be understood that tuning options 102b included in input 102 to the database tuning tool 106 may include various other physical database design recommendations in addition to or instead of the non-limiting and non-exhaustive example recommendations described above.

Output 130 may include one or more physical database design recommendations 130a and/or one or more reports 130b. In an embodiment, the physical design recommendation 130a may include a recommended optimal or best mix of rowstore and columnstore indexes for databases 122, 124, etc. For example, database tuning tool 106 may generate such a recommendation of an optimal mix of indexes (rowstore and/or columnstore) using query optimizer 114 to analyze queries in workload 102a, according to an embodiment. Recommendation 130a may include a recommendation to partition (e.g., aligned or non-aligned partitions) tables, indexes, and/or indexed views for databases referenced in workload 102a. In an embodiment, recommendation 130a may include recommended ways to tune one or more databases referenced in workload 102a for a small set of problem queries. Output 130 may also include a recommendation to drop one or more existing physical database design structures. It should be noted that the recommendation 130a included in output 130 from the database tuning tool 106 may include various other physical database design recommendations in addition to or instead of the non-limiting and non-exhaustive example recommendations described above.

In at least one embodiment, the database tuning tool 106 may generate, as part of output 130, one or more reports 130b (e.g., summaries, reports, logs, etc.). Reports 130b generated by database tuning tool 106 may describe, for example, a summary of the tuning recommendations, a date and/or time that the tuning was performed, a date and/or time that the report was created, the database server that was the target of the workload, one or more databases affected by the recommendation (e.g., recommendations 130a), an amount of time actually spent performing the tuning, a percentage improvement expected with the target workload if all recommendations 130a are implemented, and the like. For example, in an embodiment, the database tuning tool 106 may generate a report showing the count and percentage of queries in the workload that reference a given database. In an embodiment, the database tuning tool 106 may generate a report that shows the count and percentage of queries in the workload that reference a particular table or column. According to some embodiments, reports 130b may be generated in XML.

In one or more embodiments, database server 110 may include a query optimizer 114. Query optimizer 114 is a component of the database server 110 that may be configured to analyze a query (e.g., request for information or data) to determine the most efficient way to extract the requested data from the relevant databases. The query optimizer 114 may make such a determination by analyzing a query, generating one or more query execution plans for the given query, and selecting the most efficient query execution plan to execute the query. In at least one embodiment, the query optimizer 114 may take as input a query, the database schema (e.g., table and index definitions), and database statistics, and generate as output a query execution plan (or simply "query plan").

In some embodiments, the query optimizer 114 may be a cost-based optimizer that generates one or more cost-estimates for a given physical database design structure. For example, in an embodiment, database tuning tool 106 may interact with (e.g., communicate with, exchange data with, etc.) query optimizer 114 to determine corresponding cost-estimates for hypothetical indexes that database tuning tool 106 is considering for purposes of generating recommendations 130a. Additional details about query optimizer 114 and its role in the system 100 for generating physical database design tuning recommendations will be provided below.

In some embodiments, query optimizer 114 may have an extended API 116 to allow an external tool (e.g., database tuning tool 106) to create metadata entries for hypothetical indexes (e.g., indexes with only metadata and sampled statistics, and without actual data in the indexes). The query optimizer 114 may further extend the API 116 to use the hypothetical indexes, in a manner as if such indexes actually existed in the database (e.g., database 122, 124, etc.), to generate a query plan leveraging a combination of hypothetical and actual indexes. In one or more embodiments, API 116 is configured to support the creation and use of hypothetical rowstore indexes, columnstore indexes, materialized views, partitioning, as well as other index variants. In view of the various features and extensions of API 116 described above, API 116 is sometimes referred to as a "what-if" API.

Figure 2:
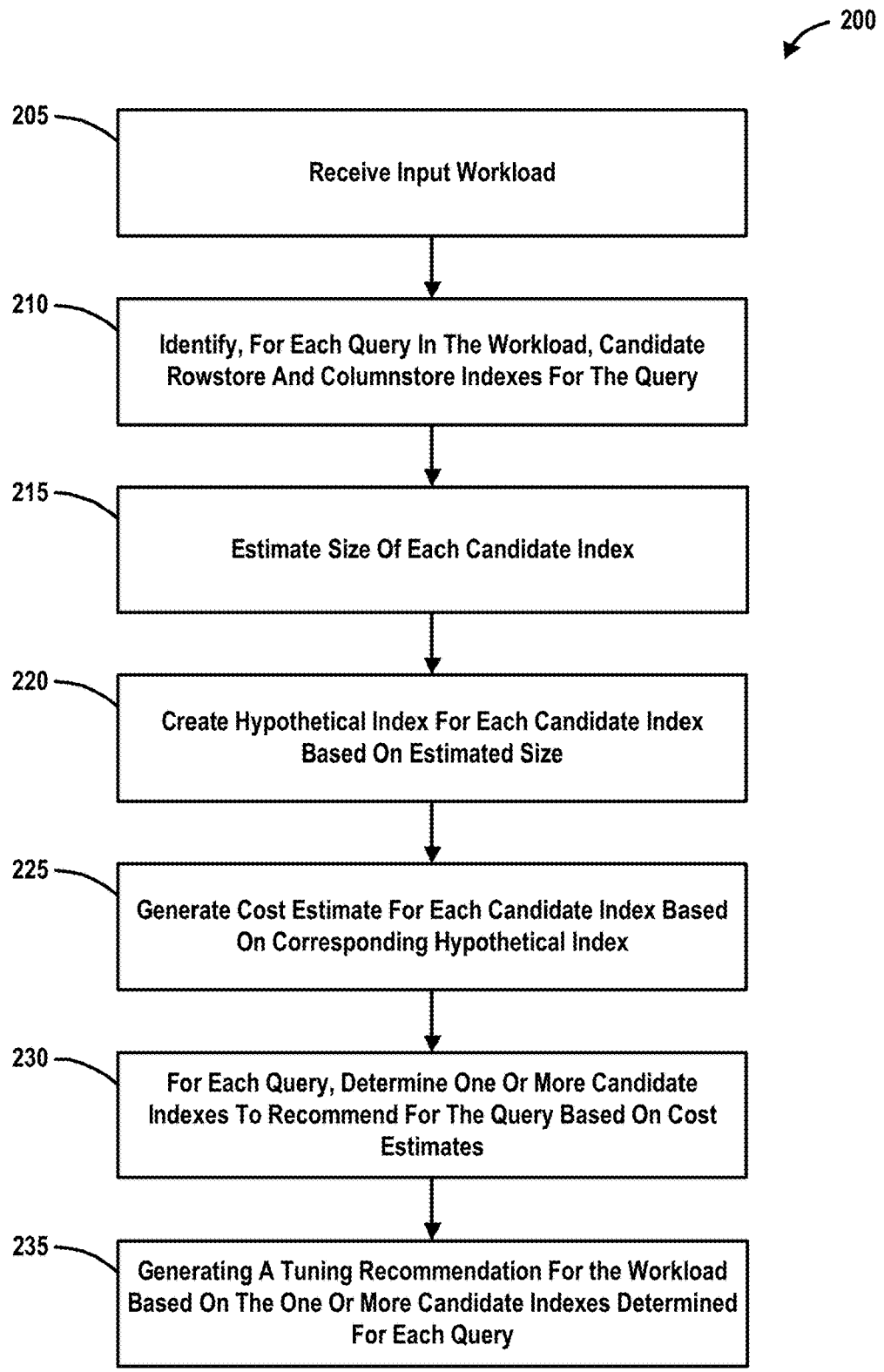
FIG. 2 is a flowchart illustrating an example method for generating physical database design tuning recommendations, according to one or more embodiments described herein.

FIG. 2 illustrates an example process 200 for generating physical database design tuning recommendations, according to one or more embodiments. In at least one embodiment, the example process 200 may be performed by a database tuning tool (e.g., database tuning tool 106 in the example system 100 shown in FIG. 1). In an embodiment, some of blocks 205-235 of the example process 200 may be performed by a database tuning tool and other of blocks 205-235 may be performed by a database management server (e.g., database server 110 in the example system 100 shown in FIG. 1). In an embodiment, some of blocks 205-235 of the example process 200 may be performed by a database tuning tool and other of blocks 205-235 may be performed by a query optimizer and/or an API of the query optimizer (e.g., query optimizer 114 and API 116 of the example system 100 shown in FIG. 1).

At block 205, an input workload may be received. For example, in an embodiment, a workload may be received (e.g., obtained, retrieved, etc.) as part of an input to a database tuning tool (e.g., workload 102a of input 102 to database tuning tool 106 in the example system 100 shown in FIG. 1). In an embodiment, the workload may comprise a plurality of queries. The workload received at block 205 may include one or more statements to execute against one or more databases (e.g., one or more of databases 122, 124, etc., in the example system 100 shown in FIG. 1). For example, the workload received at block 205 may include one or more statements written in a language for creating, updating, and/or querying relational database management systems (e.g., SQL, TSQL, etc.). In an embodiment, one or more of the statements in the workload may be associated with a weight that represents the relative importance of the statement to the performance of the database system.

In at least one embodiment, a workload may be received at block 205 together with one or more tuning options (e.g., tuning options 102b). The one or more tuning options that may be received with the workload (at block 205) may include, for example, a time constraint (e.g., a maximum tuning time), a storage constraint (e.g., a maximum disk space for tuning recommendations), an alignment constraint, a feature to be tuned, and/or any of the various other tuning option examples described above.

At block 210, for each query in the workload received at block 205, a plurality of candidate indexes may be identified for the query. The candidate indexes may include rowstore indexes, columnstore indexes, materialized views, partitioning, and/or other index variants known to those of ordinary skill in the art. According to an embodiment, the candidate indexes may be identified at block 210 based on the workload received at block 205 (e.g., based on the queries in the received workload). In at least one embodiment, example process 200 may only consider columnstore indexes on tables that were referenced in the query (workload) received at block 205. In some implementations, the database management system might not support columnstore indexes on all column types (e.g., the database management system may have limitations on one or more column data types that cannot be included in a columnstore index). In such instances, the database schema information for the database system may be used to determine which columns can be included in a columnstore index, according to an embodiment. In at least some embodiments, both clustered and non-clustered columnstore index recommendations are supported, and so the data type limitation described above (that columnstore indexes are not supported on all column data types) can also influence what kind of columnstore index the database tuning tool can recommend. For example, if a table has a column of type that is not supported by columnstore indexes, a clustered columnstore index cannot be built on that table since a clustered index must include all columns. In such a case, a candidate non-clustered index may be selected that ignores the columns whose types are not supported, according to an embodiment.

In some implementations, the database server might also limit the number of columnstore indexes that can be built on a table. For example, the database server may support only one columnstore index per table. A constraint such as this can also influence the columnstore candidates. There may also be design considerations that impact which columns will be included in the columnstore index. For example, one option is to only include the columns that were referenced in the workload provided. While this is an option that example process 200 can support, in at least some embodiments, all columns (whose types can be included in a columnstore index) are selected to be part of the columnstore index. This is partly because of the fact that if a column is not accessed by the query, the server does not need to access those columns. In an embodiment, the database server's limitation of one columnstore index per table may be addressed by, for example, building the widest columnstore index that includes all columns in a table which has been referenced in the workload. It should be noted, however, that due to the design complexity of this option, the former option (only include the columns that were referenced in the workload provided) may be a more appropriate and cost-effective approach. Depending on the input options specified when invoking the database tuning tool, the other B-tree (rowstore) candidate indexes may also be generated.

Once the candidate indexes are identified at block 210, at block 215 a size of each candidate index may be estimated. Additional details about estimating the size of a columnstore index are provided below.

At block 220, a hypothetical index may be created for each of the candidate indexes. In an embodiment, a hypothetical index may be created for a candidate index based on the estimated size of the candidate index (determined at block 215).

At block 225, a cost estimate may be generated for each of the candidate indexes. In an embodiment, a cost estimate may be generated (at block 225) for a given candidate index based on the corresponding hypothetical index created for that candidate at block 220.

At block 230 of the example process 200, for each query (in the received workload), one or more of the candidate indexes may be selected (e.g., determined, identified, etc.) to recommend for the query. In an embodiment, the selection of one or more of the candidate indexes for each query at block 230 may be based on the cost estimates generated for the corresponding hypothetical indexes at block 225.

At block 235, the one or more candidate indexes selected for each query at block 230 may be combined into (or considered for inclusion in) a tuning recommendation for the workload. For example, in an embodiment, the one or more candidate indexes selected for each query may be considered for inclusion in a recommendation output from a database tuning tool (e.g., recommendation 130a of output 130 from database tuning tool 106 in the example system 100 shown in FIG. 1).

Further details about the various operations of blocks 205-235 will be provided in the sections below.

In some embodiments, once the candidate indexes have been identified (e.g., at block 210 of the example process 200 shown in FIG. 2). the next phase of the process for generating physical database design recommendations is to search through the alternative configurations to determine which indexes are beneficial to the workload (e.g., received at block 205). In at least one embodiment, the database tuning tool (e.g., database tuning tool 106 in the example system 100 shown in FIG. 1) may use a greedy search process for this purpose and may consult the query optimizer (e.g., query optimizer 114) to estimate the benefits and improvement. In such an embodiment, this search process may start with some seed index configurations and then gradually add indexes based on the search strategy as well as the query optimizer cost estimates. To support columnstore indexes in conjunction with rowstore indexes, the methods described herein (e.g., example method 200) may extend this search strategy in one or more of the following example ways:

(i) for each candidate columnstore index that was identified (e.g., at block 210), create a hypothetical columnstore index (at block 220);

(ii) estimate the per-column size of the columnstore index (at block 215);

(iii) when evaluating the estimated improvement of a query in a configuration that contains columnstore indexes, use the new extensions of the query optimizer's "what-if" API (described above) to specify the per-column sizes to the query optimizer; and (iv) ensure that during execution of database tuning tool's search process a valid configuration is recommended in the presence of columnstore indexes (e.g., a recommendation should not be made for a configuration that violates any constraints set due to input options or limitations imposed by the database management system on columnstore index recommendations).

In some embodiments, if columnstore index candidates are selected (e.g., at block 230) in the optimal configuration chosen by the database tuning tool, the API and database tuning tool may also be extended to obtain the data definition languages for these columnstore indexes.

Columnstore Size Estimation

In order to use the query optimizer's "what-if" API (e.g., API 116 of query optimizer 114 in the example system 100 shown in FIG. 1) to estimate the benefit of building a columnstore index on the specified workload without actually building the columnstore index, it is necessary to be able to estimate the size of the columnstore index at the granularity of individual columns. In addition, in some implementations the database tuning tool (e.g., database tuning tool 106) may support a maximum storage bound constraint, which requires an estimate of the size of every columnstore index considered as a candidate to be built so that a recommendation does not violate that constraint.

The main challenge of columnstore size estimation is that when the database management system builds a columnstore index, it applies a combination of encoding and compression techniques that make the size of a columnstore index dependent on the data distribution. That is, the size of a column after building a columnstore index can be significantly different from the original size, and the final size is a property of the data on which the columnstore index is built. This is different from the B-tree indexes which are not compressed by default, and hence the size of the index is not very different from that of the base data from which the index is being built. One way to phrase the challenge of columnstore size estimation is: given a table T with C columns and N rows in a relational database which is in rowstore format (either a B-tree or a Heap), estimate the size of the data on disk after a columnstore index is built on the table. Since columnstore indexes store data per column, this estimation logic must provide the size estimates for every individual column which is included in the columnstore index.

When building a columnstore index, the goal is to select a sort ordering of the columns that will provide the maximum amount of compression once the columnstore index is built. That is, the goal is to find a set of columns for which results in the smallest on-disk size after the index is built. Database management systems use a collection of encoding techniques with the goal of minimizing the size of the index after it is compressed. These encoding techniques include, for example, dictionary encoding to convert data values from non-numeric domains (such as strings) to the numeric domain, value encoding for numeric columns, and run length encoding to compress sorted runs of data (e.g., a stretch of identical values). As will be described in greater detail below, the columnstore index size estimation process of the present disclosure is designed to estimate the size of the columns after these encoding techniques are applied and the data is compressed, according to an embodiment.

Figure 3:
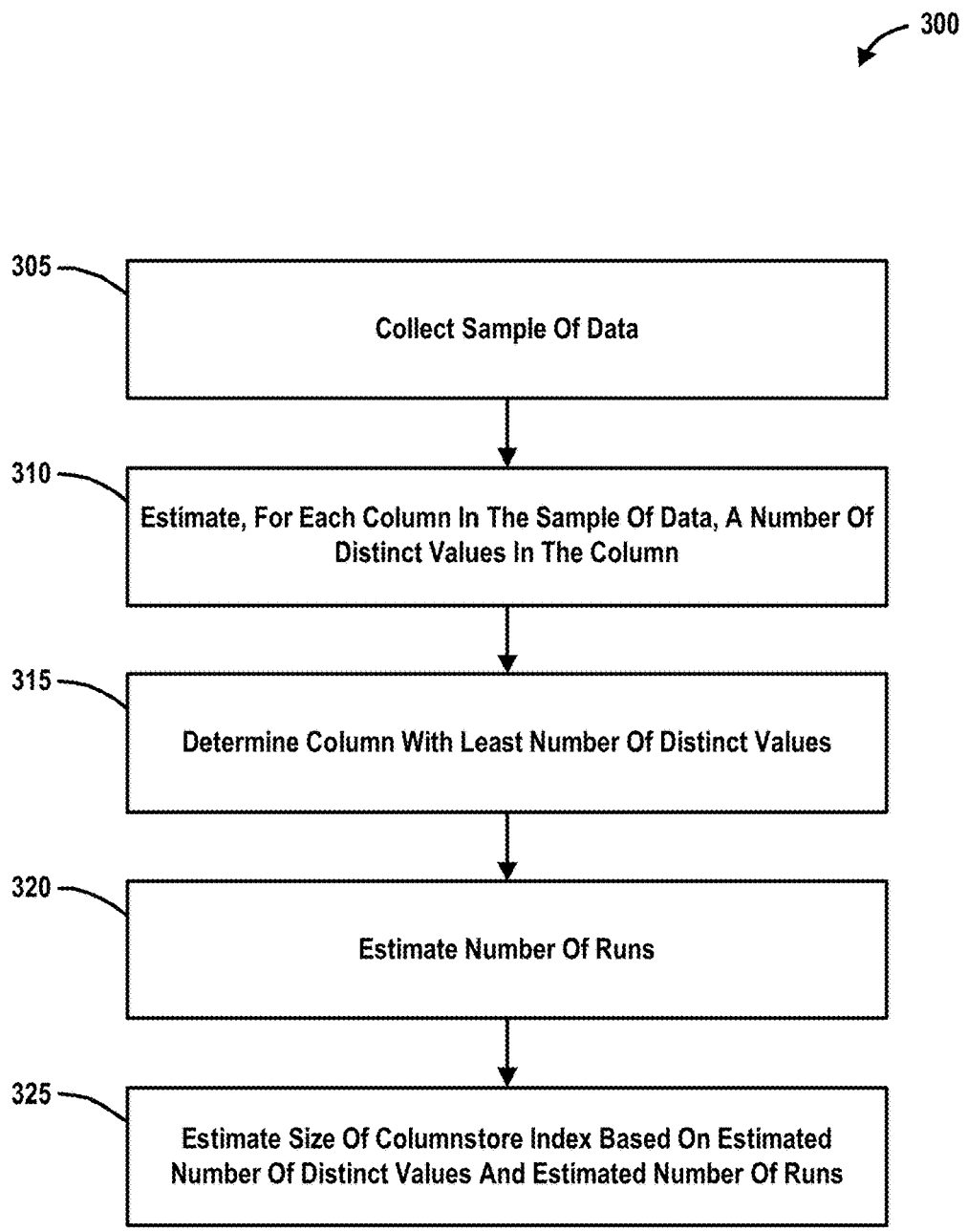
FIG. 3 is a flowchart illustrating an example method for estimating a size of a columnstore index, according to one or more embodiments described herein.

FIG. 3 illustrates an example process for estimating a size of a columnstore index, according to one or more embodiments. In at least one embodiment, the operations of some or all of blocks 305-325 may be performed to estimate the size of each candidate columnstore index at block 215 of the example process 200 shown in FIG. 2 and described in detail above. In some embodiments, the size of each candidate columnstore index may be estimated at block 215 using another suitable technique.

To minimize the cost (e.g., resources) associated with running the database tuning tool, it is not affordable to build the entire index or execute each of these encoding processes on the data. As such, in some embodiments, a technique is used to approximately estimate the size of the index by looking only at samples of the data, analyzing the sample to derive properties of the data that can influence the encoding techniques used, and then use mathematical models to estimate the size of the index. Such a technique is described in further detail below with respect to the example process 300 shown in FIG. 3.

At block 305, a small sample of data may be collected from the table (e.g., if there are n data pages in the table, the square root of n pages are sampled, though this is configurable in one or more embodiments). Run-length encoding depends on the number of runs that will be there in the data and the length of each of these runs. As used herein, a "run" is defined as a sequence of identical values. Intuitively, the fewer the number of distinct values, the more repetition there is in the data, and hence, if the data is sorted, can result in the fewest runs, which results in the best compression.

Since the goal of the compression process is to minimize the size of the index, the compression process is likely to pick the column with the least distinct values and sort the data using this column. As such, at block 310 an estimate of the number of distinct values in a column, for all columns that are part of the columnstore index in the sampled data, may be generated.

At block 315, a determination may be made as to the column with the least (fewest) number of distinct values. For example, in an embodiment, it may be determined at block 315 which column has the least number of distinct values based on the estimates generated at block 310. The example process 300 considers that the data will be sorted by the column determined (e.g., identified, selected, etc.) at block 315.

At block 320, an estimate may be generated as to the number of runs there will be for the column determined to have the least number of distinct values at block 315. In at least one embodiment, block 320 may be repeated for the remaining columns in the index.

In at least one embodiment, to reduce associated overhead costs, the process 300 may be optionally terminated after the sort order of the first k columns has been determined, where k is configurable and less than or equal to m, the number of columns in the index.

At block 325, an estimated size of the columnstore index may be generated based on the estimated number of distinct values and the estimated number of runs for the columns in the columnstore index. In an embodiment, block 325 may include estimating a per-column size of the columnstore index based on the estimated number of distinct values and the estimated number of runs for the columns in the columnstore index. Since the per-column size estimation is based on a sample of data (e.g., collected at block 305), the per-column sizes are scaled-up in proportion to the sampling rate to obtain an overall size estimate for the full columnstore index, according to an embodiment.

Further details about the operations of blocks 305-325, as well as variations and alternatives to one or more of these operations, will be provided in the following descriptions of additional examples.

First Example Columnstore Size Estimation

In accordance with at least one embodiment, the process for estimating the size of a columnstore index may be as follows. Given table T with C columns and N rows for which the size of the columnstore index is to be estimated, n rows may be sampled. In one embodiment, $n \leq N$. In another embodiment, $n = \sqrt{N}$. It should be noted that other values are also possible for n, according to some embodiments. To reduce the overhead costs associated with sampling, instead of sampling individual rows, a sufficient number of database pages may be sampled to return n rows. To convert number of rows to number of pages, it may be necessary to first determine the number of pages in the table's rowstore representation. For example, the number of pages in the table's rowstore representation may be determined based on metadata associated with the table. The average size per row of each column in the table may then be determined. If it is a fixed-width column, the average size can be obtained in a straightforward manner known to those of ordinary skill in the art. For variable-width columns, a random sample of column values is selected from the table, the total size of the sampled number of columns is determined, and then the average column size is computed by dividing the total size of the sampled number of columns by the number of rows in the sample, according to an embodiment. Once the average column width per row is determined, the number of rows in a page is determined by dividing the fixed page size (which is known for a given database and may be, for example, 4 KB, 6 KB, 8 KB, etc.) by the average width of each row.

Given the sample of n rows, a columnstore index can now be built on the sample. The per-column size of the columnstore index build on the sampled set of rows may then be measured. The per-column size measurements are then scaled-up proportional to the sampling rate.

Second Example Columnstore Size Estimation

In one or more embodiments, the process for estimating the size of a columnstore index may differ from the first example described above. As with the first example described above, given table T with C columns and N rows for which the size of the columnstore index is to be estimated, n rows may be sampled. It should be noted that the techniques for sampling described above with respect to the first example of columnstore size estimation may also be utilized in this second example of columnstore size estimation.

It should also be noted that one or more aspects of this second example of columnstore size estimation may be similar to one or more aspects of the example process 300 shown in FIG. 3 and described in detail above. That is, in this second example of columnstore size estimation, the goal is to estimate the compression with dictionary and run length encoding using distinct value estimation. By generating an estimate of the number of distinct values there is in each set of data items, these values can be encoded in a dictionary of that size and each value can be assigned a number corresponding to the entry in the dictionary. Similarly, for run length encoding, the number of runs, and the average length of each run can be estimated using distinct values. As such, this second example uses a distinct value estimation technique to estimate the size of the columnstore.

In an embodiment, it also may be necessary to determine an ordering of the columns that results in the most compression. This can be achieved, for example by identifying (e.g., determining, selecting, etc.) the least distinct column among all the columns included in the index. The least distinct column may then be used as the leading column for the sort, and with that column as the prefix, it is possible to then identify the next least distinct column. This procedure may be repeated for all the columns in the index to determine the sort order of the columns in the index, according to an embodiment.

It should be noted that, given a prefix of columns (which is a subset of the total number of columns in the index), it is necessary to estimate the number of distinct values. In an embodiment, the prefix columns may be used as a grouping key (that is, for each sampled row, the values of the columns in the prefix form the key of a group). The number of occurrences of the groups may then be calculated (e.g., by computing a frequency distribution for the group).

Once the frequency distribution is determined, the number of small groups (e.g., groups which appear less than or equal to $\in$, where $\in$ is usually set to 1) may be counted, and any other group whose frequency is greater than $\in$ may be counted towards large groups. In an embodiment, the number of distinct values is obtained by scaling up the count of small groups using a multiplier proportional to the sampling ratio and adding up the number of large groups. An example of this scaling is as follows: assume cntSmall is the count for the small groups, and cntLarge is the count of the large groups, then the number of distinct values is $$cntSmall \times \sqrt{\frac{N}{n}} + cntLarge.$$

According to an embodiment, run length is also estimated by computing the number of distinct values and using their frequencies to determine the length of each run, after the values are sorted in the specific order.

It should be understood that there are numerous minor variations which can be used for the above examples of columnstore size estimation. One shortcoming of page-level sampling is that if the data items from which the sample is being collected are already sorted, then selecting a random page of data and selecting all rows from the page (instead of selecting a random set of rows) introduces bias if there are repeated values. A known approach to eliminate this bias is to only select the distinct values that appear in the page.

Another variation is that once the sample of rows is collected, instead of estimating the distinct values on the entire sample, the sample may be further split into smaller sub-samples. The distinct values can then be computed on the sub-samples, and a combination of scaling and summation can be used across the sub-samples to estimate the size of the columnstore, in accordance with at least one embodiment.

Deriving Workload from Sever Execution History

As described above, the choice of indexes (e.g., columnstore, rowstore, or both) is dependent on the workload provided as an input to the database tuning tool (e.g., workload 102a of input 102 provided to database tuning tool 106 in the example system 100 shown in FIG. 1). In at least one embodiment, the database management server (e.g., database server 110) may include tracking functionality to monitor and track historical workload information. For example, in an embodiment, the database management server may contain execution information of historical queries including, for example: query frequency, plans, duration, CPU and I/O usage, etc. In accordance with one or more embodiments of the present disclosure, the database tuning tool may be configured to pick a suitable workload by analyzing the stored historical workload information. In an embodiment, the database tuning tool may be configured to pick a suitable workload in an automatic manner. In such embodiments where the database tuning tool is configured to pick a suitable workload by analyzing the stored historical workload information, the database tuning tool may exploit query frequency and duration information to focus tuning efforts on the most important queries logged by the database management server.

As described above, choice of optimal physical database design structures is important for application performance tuning. Therefore, having the ability to generate and provide recommendations for both rowstore and columnstore indexes by analyzing the workload is a significant and desired improvement offered by the techniques of the present disclosure.

In at least one embodiment, the ability to generate and provide physical design recommendations with respect to columnstore and/or rowstore indexes may be exposed as features in a customer-facing tool.

As described above, the methods of the present disclosure include a number of features that offer improvements over existing techniques for tuning physical database design including, for example, analyzing a workload to determine columnstore indexes to build, as well as estimating the size of columnstore indexes without building them so that a determination can be made as to the estimated improvement when the actual columnstore indexes are built.

Analyzing the workload to recommend physical design structure is a common problem, and as such there has been a significant body of work. However, columnstore indexes are somewhat newer, and so is the requirement to support a wide variety of workloads (e.g., operational analytics) in a same database instance. As such, the examples and embodiments described herein address the need for a tool that analyzes a workload as the basis for recommending a mix (e.g., combination) of rowstore and columnstore indexes.

Figure 4:
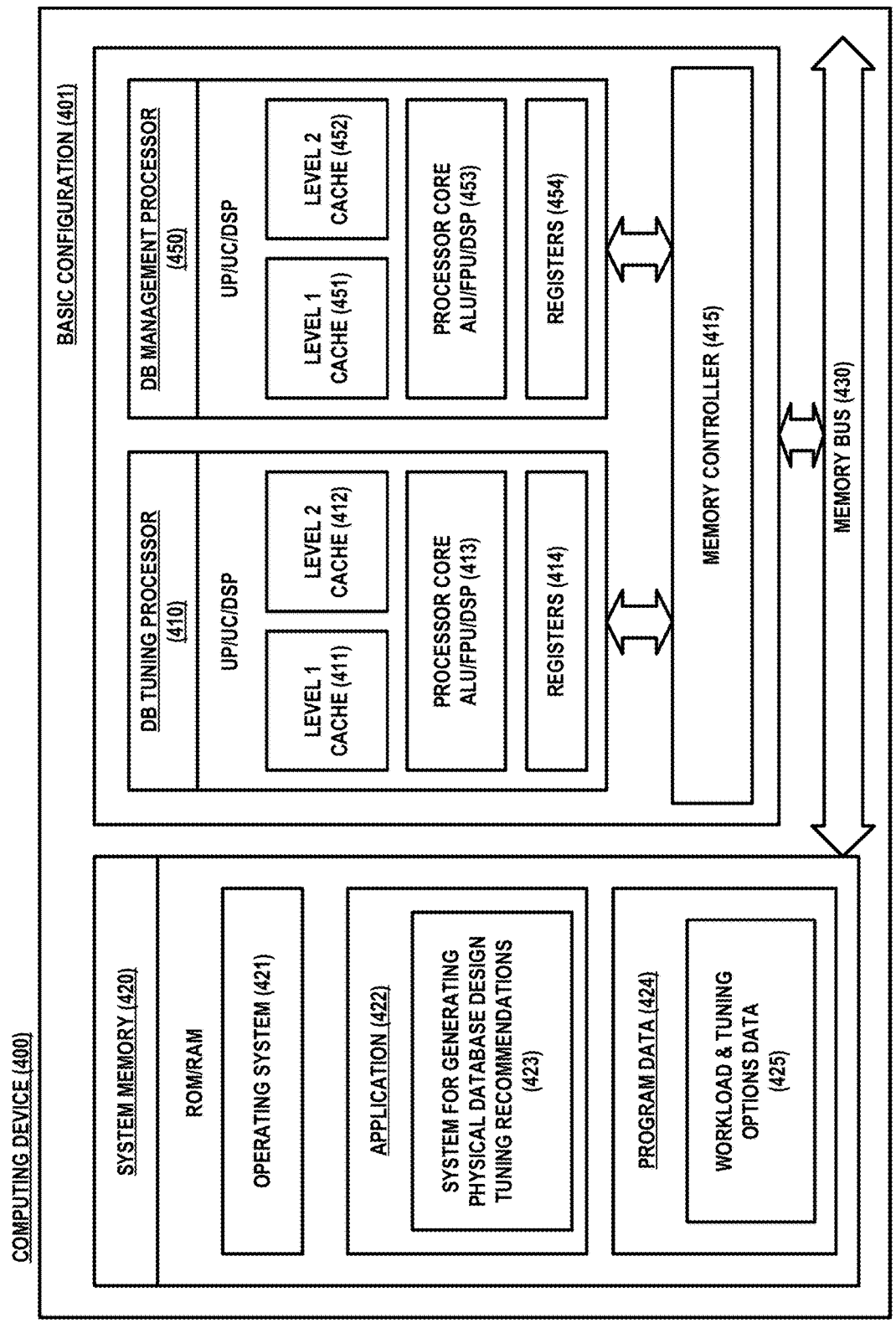
FIG. 4 is a block diagram illustrating an example computing device arranged for generating physical database design tuning recommendations, according to one or more embodiments described herein.

FIG. 4 is a high-level block diagram of an exemplary computing device (400) that is arranged for generating physical database design tuning recommendations, in accordance with one or more embodiments described herein. For example, in accordance with at least one embodiment of the present disclosure, the computing device (400) may be configured to analyze a input workload to identify and recommend a set of rowstore and columnstore indexes optimal for the performance of the workload. In at least one embodiment, the computing device (400) may be configured to estimate the size of a columnstore index (at the granularity of each column) without actually building the index, estimate the improvement in query performance that each columnstore index would result in when built, and automatically derive the workload used for the physical design tuning task by analyzing stored query execution history data. In a basic configuration (401), the computing device (400) typically includes one or more processors (410, 450) and system memory (420). A memory bus (430) can be used for communicating between the one or more processors (410, 450) and the system memory (420).

Depending on the desired configuration, the one or more processors (410, 450) can be of any type including but not limited to a microprocessor (µP), a microcontroller (µC), a digital signal processor (DSP), or the like, or any combination thereof. For example, in accordance with at least one embodiment, one processor may be a Database Tuning Processor (410) while another processor is a dedicated Database Management Processor (450). In such a configuration, the dedicated Database Management Processor (450) may operate continuously to perform, for example, interaction with a client, other applications, and one or more databases (e.g., databases 122, 124, etc., in the example system 100 shown in FIG. 1) to capture and analyze data. For example, in an embodiment, the dedicated Database Management Processor (450) may serve as a relational database management server configured to store and retrieve data from one or more databases based on received requests for such data. Either or both of the processors (410, 450) can include one more levels of caching, such as a level one cache (411, 451) and a level two cache (412, 452), a processor core (413, 453), and registers (414, 454). The processor core (413, 453) can include an arithmetic logic unit (ALU), a floating point unit (FPU), a digital signal processing core (DSP Core), or the like, or any combination thereof. A memory controller (415) can also be used with the one or more processors (410, 450), or in some implementations separate memory controllers (415) can be an internal part of each of the one or more processors (410, 450).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a system for generating physical database design tuning recommendations (423). In accordance with at least one embodiment of the present disclosure, the system for generating physical database design tuning recommendations (423) is designed to analyze an input workload to identify and recommend a set of rowstore and columnstore indexes optimal for the performance of the workload, estimate the size of a columnstore index (at the granularity of each column) without actually building the index, generate an estimated improvement in query performance that each columnstore index would result in when built, and derive a workload to use for the physical design tuning task by analyzing stored query execution history data for a given database.

Program Data (424) may include storing instructions that, when executed by the one or more processing devices, implement a system (423) and method for generating physical database design tuning recommendations. Additionally, in accordance with at least one embodiment, program data (424) may include workload and tuning options data (425), which may relate to, for example, statements to execute against one or more databases (e.g., where the statements may be written in a language for creating, updating, and/or querying relational database management systems) and one or more options (e.g., constraints, parameters, preferences, etc.) for customizing a tuning operation to be performed on the one or more databases. In accordance with at least some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that includes any of the above functions. In addition, the computing device (400) may also be implemented as a personal computer including both laptop computer and non-laptop computer configurations, one or more servers, Internet-of-Things systems, and the like.

One of ordinary skill in the art can appreciate that a computer or other client device can be deployed as part of a computer network. In this regard, one or more embodiments of the present disclosure pertain to any computer system having any number of memory or storage units, and any number of applications and processes occurring across any number of storage units or volumes. One or more embodiments of the present disclosure may apply to an environment with server computers and client computers deployed in a network environment, having remote or local storage. One or more embodiments of the present disclosure may also apply to a standalone computing device, having programming language functionality, interpretation and execution capabilities.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While particular embodiments of the subject matter have thus been described, it is to be appreciated that other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous.

The invention claimed is:

1. A computer-implemented method for tuning a database, the method comprising:
   receiving, by a computer, an input workload, the workload including a plurality of queries;
   identifying, by the computer, for each query in the workload, candidate indexes for the query, wherein the candidate indexes include rowstore indexes and columnstore indexes;
   for each candidate columnstore index of the candidate indexes:
      estimating, by the computer, a size of the candidate columnstore index, wherein the estimating of the size of the candidate columnstore index includes:
         collecting a sample of data from a table of the database to create statistics corresponding to the candidate columnstore index;
         estimating, for each column of a plurality of columns in the sample of data, a number of distinct values in the column;
         estimating, for each column of the plurality of columns in the sample of data, a number of runs in the column; and
         generating an estimated size of the candidate columnstore index based on the estimated numbers of distinct values in the columns and the estimated numbers of runs in the columns;
      creating, by the computer, a corresponding hypothetical index based on the estimated size of the candidate columnstore index, and
      generating, by the computer, a cost estimate for the candidate columnstore index based on the corresponding hypothetical index created for the candidate columnstore index;
   for each query in the workload, determining, by the computer, one or more of the candidate indexes to recommend for the query based on the generated cost estimates; and
   generating, by the computer, a tuning recommendation for performance of the workload based on the one or more candidate indexes determined for each query in the workload.

2. The method of claim 1, wherein creating a hypothetical index includes:
   creating an index (i) with metadata and sampled statistics and (ii) without actual data.

3. The method of claim 1, wherein, for each candidate columnstore index, a hypothetical index is created using an application programming interface (API) of a database server.

4. The method of claim 1, wherein generating an estimated size of the candidate columnstore index based on the estimated numbers of distinct values in the columns and the estimated numbers of runs in the columns includes:
   determining a per-column size of the columnstore index based on the estimated numbers of distinct values in the columns and the estimated numbers of runs in the columns; and
   scaling-up the determined per-column size of the columnstore index using a sampling rate associated with the sample of data.

5. The method of claim 1, wherein collecting a sample of data from a table of the database includes sampling a number of rows in the table.

6. The method of claim 1, wherein, for a candidate columnstore index, estimating a size of the candidate columnstore index includes:
   building a columnstore index on the sample of data collected from the table of the database;
   determining a per-column size of the columnstore index built on the sample of data; and
   scaling-up the determined per-column size of the columnstore index using a sampling rate associated with the sample of data.

7. A system for tuning a database, the system comprising:
   one or more processors; and
   a non-transitory computer-readable medium coupled to the one or more processors having instructions stored thereon that, when executed by the one or more processors, cause the one or more processors to perform operations comprising:
      receiving an input workload, the workload including a plurality of queries;

identifying, for each query in the workload, candidate indexes for the query, wherein the candidate indexes include rowstore indexes and columnstore indexes;

for each candidate columnstore index of the candidate indexes:

estimating a size of the candidate columnstore index, wherein the estimating of the size of the candidate columnstore index includes:

collecting a sample of data from a table of the database to create statistics corresponding to the candidate columnstore index;

estimating, for each column of a plurality of columns in the sample of data, a number of distinct values in the column;

estimating, for each column of the plurality of columns in the sample of data, a number of runs in the column; and generating an estimated size of the candidate columnstore index based on the estimated numbers of distinct values in the columns and the estimated numbers of runs in the columns;

creating a corresponding hypothetical index based on the estimated size of the candidate columnstore index, and generating a cost estimate for the candidate columnstore index based on the corresponding hypothetical index created for the candidate columnstore index;

for each query in the workload, determining one or more of the candidate indexes to recommend for the query based on the generated cost estimates; and generating a tuning recommendation for performance of the workload based on the one or more candidate indexes determined for each query in the workload.

8. The system of claim 7, wherein the one or more processors are caused to perform further operations comprising:

creating an index (i) with metadata and sampled statistics and (ii) without actual data.

9. The system of claim 7, wherein, for each candidate columnstore index, a hypothetical index is created using an application programming interface (API) of a database server.

10. The system of claim 7, wherein the one or more processors are caused to perform further operations comprising: determining a per-column size of the columnstore index based on the estimated numbers of distinct values in the columns and the estimated numbers of runs in the columns; and scaling-up the determined per-column size of the columnstore index using a sampling rate associated with the sample of data.

11. The system of claim 7, wherein collecting a sample of data from a table of the database includes sampling a number of rows in the table.

12. The system of claim 7, wherein the one or more processors are caused to perform further operations comprising: building a columnstore index on the sample of data collected from the table of the database determining a per-column size of the columnstore index built on the sample of data; and scaling-up the determined per-column size of the columnstore index using a sampling.

13. A tangible, non-transitory computer readable medium, or media, storing machine readable instructions that, when executed by one or more processors, cause the one or more processors to perform operations comprising:

receiving an input workload, the workload including a plurality of queries;

identifying, for each query in the workload, candidate indexes for the query, wherein the candidate indexes include rowstore indexes and columnstore indexes;

for each candidate columnstore index of the candidate indexes:

estimating a size of the candidate columnstore index, wherein the estimating of the size of the candidate columnstore index includes:

collecting a sample of data from a table of the database to create statistics corresponding to the candidate columnstore index;

estimating, for each column of a plurality of columns in the sample of data, a number of distinct values in the column;

estimating, for each column of the plurality of columns in the sample of data, a number of runs in the column; and generating an estimated size of the candidate columnstore index based on the estimated numbers of distinct values in the columns and the estimated numbers of runs in the columns;

creating a corresponding hypothetical index based on the estimated size of the candidate columnstore index, and generating a cost estimate for the candidate columnstore index based on the corresponding hypothetical index created for the candidate columnstore index;

for each query in the workload, determining one or more of the candidate indexes to recommend for the query based on the generated cost estimates; and generating a tuning recommendation for performance of the workload based on the one or more candidate indexes determined for each query in the workload.

14. The tangible, non-transitory computer-readable medium or media of claim 13, wherein the machine readable instructions, when executed by the one or more processors, cause the one or more processors to perform further operations comprising:

creating an index (i) with metadata and sampled statistics and (ii) without actual data.

15. The tangible, non-transitory computer-readable medium or media of claim 13, wherein, for each candidate columnstore index, a hypothetical index is created using an application programming interface (API) of a database server.

16. The tangible, non-transitory computer-readable medium or media of claim 13, wherein the machine readable instructions, when executed by the one or more processors, cause the one or more processors to perform further operations comprising: determining a per-column size of the columnstore index based on the estimated numbers of distinct values in the columns and the estimated numbers of runs in the columns; and scaling-up the determined per-column size of the columnstore index using a sampling rate associated with the sample of data.

17. The tangible, non-transitory computer-readable medium or media of claim 13, wherein the machine readable instructions, when executed by the one or more processors, cause the one or more processors to perform further operations comprising:

building a columnstore index on the sample of data collected from the table of the database;

determining a per-column size of the columnstore index built on the sample of data; and scaling-up the determined per-column size of the column-store index using a sampling rate associated with the sample of data.

* * * * *